United States Patent
Li et al.

(10) Patent No.: US 12,505,183 B2
(45) Date of Patent: Dec. 23, 2025

(54) DIGITAL WATERMARKING-BASED DIGITAL ASSET OWNERSHIP VERIFICATION

(71) Applicant: Disney Enterprises, Inc., Burbank, CA (US)

(72) Inventors: Hui Li, Shanghai (CN); Bin Feng, Shanghai (CN); Ni Chia Koay, Tampines (SG); Chen Hu Wu, Draycott (SG)

(73) Assignee: Disney Enterprises, Inc., Burbank, CA (US)

( * ) Notice: Subject to any disclaimer, the term of this patent is extended or adjusted under 35 U.S.C. 154(b) by 204 days.

(21) Appl. No.: 18/223,424

(22) Filed: Jul. 18, 2023

(65) Prior Publication Data

US 2024/0119128 A1 Apr. 11, 2024

Related U.S. Application Data

(60) Provisional application No. 63/415,137, filed on Oct. 11, 2022.

(51) Int. Cl.
*H04L 29/06* (2006.01)
*G06F 21/16* (2013.01)
*H04L 9/40* (2022.01)

(52) U.S. Cl.
CPC .......... *G06F 21/16* (2013.01); *H04L 63/0435* (2013.01)

(58) Field of Classification Search
CPC .............................. G06F 21/16; H04L 63/0435
See application file for complete search history.

(56) References Cited

U.S. PATENT DOCUMENTS

| | | | |
|---|---|---|---|
| 7,984,511 B2 * | 7/2011 | Kocher | H04N 21/4135 726/28 |
| 9,094,207 B2 * | 7/2015 | Attia | H04W 12/06 |
| 11,128,468 B2 | 9/2021 | Gupta | |
| 11,475,494 B1 | 10/2022 | Davis | |

(Continued)

FOREIGN PATENT DOCUMENTS

WO    WO 2022245595 A1    11/2022

OTHER PUBLICATIONS

"Introducing CenterPrime watermark NFT Technology" by CenterPrime Mar. 21, 2022 5 Pgs.

(Continued)

*Primary Examiner* — Shawnchoy Rahman
(74) *Attorney, Agent, or Firm* — Farjami & Farjami LLP

(57) ABSTRACT

A system includes a hardware processor, and a system memory storing a software code. The hardware processor executes the software code to receive, from a user, a request related to a digital asset, obtain, from the user, verification data for use in creating a record of ownership of the digital asset, create, using the verification data, the record of ownership of the digital asset in an ownership database, embed a digital watermark into the digital asset to generate a digitally watermarked digital asset, and provide, to the user, the digitally watermarked digital asset. The digital watermark embedded in the digitally watermarked digital asset and the record of ownership of the digital asset in the ownership database enable ownership verification of the digital asset.

20 Claims, 5 Drawing Sheets

(56) References Cited

U.S. PATENT DOCUMENTS

| | | | | |
|---|---|---|---|---|
| 2001/0044780 A1* | 11/2001 | Miyazaki | ................ | G06F 21/10 |
| | | | | 705/52 |
| 2003/0200177 A1* | 10/2003 | Kugai | ................ | G06Q 20/3674 |
| | | | | 713/168 |
| 2017/0286710 A1* | 10/2017 | Cheung | ................ | H04L 63/083 |
| 2020/0294011 A1* | 9/2020 | Robertson | ............ | G06Q 20/405 |
| 2021/0256070 A1 | 8/2021 | Tran et al. | | |
| 2022/0366061 A1 | 11/2022 | Spivack et al. | | |
| 2022/0374503 A1 | 11/2022 | Goldston et al. | | |
| 2023/0010172 A1 | 1/2023 | Myers | | |
| 2024/0211552 A1* | 6/2024 | Li | .......................... | G06F 21/44 |

OTHER PUBLICATIONS

Nelson Aguilar "How to turn your NFT into a verified profile picture on Twitter" CNET Jan. 24, 2022 6 pgs.

"NFT Watermark Lab" Jul. 17, 2021 https://twitter.com/labwatermark?lang=en 10 Pgs.

\* cited by examiner

DIGITAL WATERMARKING-BASED DIGITAL ASSET OWNERSHIP VERIFICATION

RELATED APPLICATIONS

The present application claims the benefit of and priority to a U.S. Provisional Patent Application Ser. No. 63/415,137 filed on Oct. 11, 2022, and titled "Digital Watermarking-Based NFT Ownership Verification," which is hereby incorporated fully by reference into the present application.

BACKGROUND

The acquisition and display of digital asset collections such as non-fungible token (NFT) based digital collections have become increasingly popular as symbols of status, particularly among users of social media. However, some social media users simply display digital assets that have been copied, thereby diluting the status associated with legitimately owned digital assets and digital asset collections. Because the secure digital ledgers on which digital asset ownership is recorded are typically independent from the social media platforms or web applications used to display digital asset collections, those social network platforms or web applications are unable to corroborate actual digital asset ownership. Another complication is that, due to the number of different blockchains or other types of secure digital ledgers used to record digital asset ownership, a layman user would find it hard to identify which secure digital ledger to consult for evidence of digital asset ownership, making identification of the provenance of digital assets displayed via social media or web applications undesirably uncertain.

DETAILED DESCRIPTION

Figure 1:
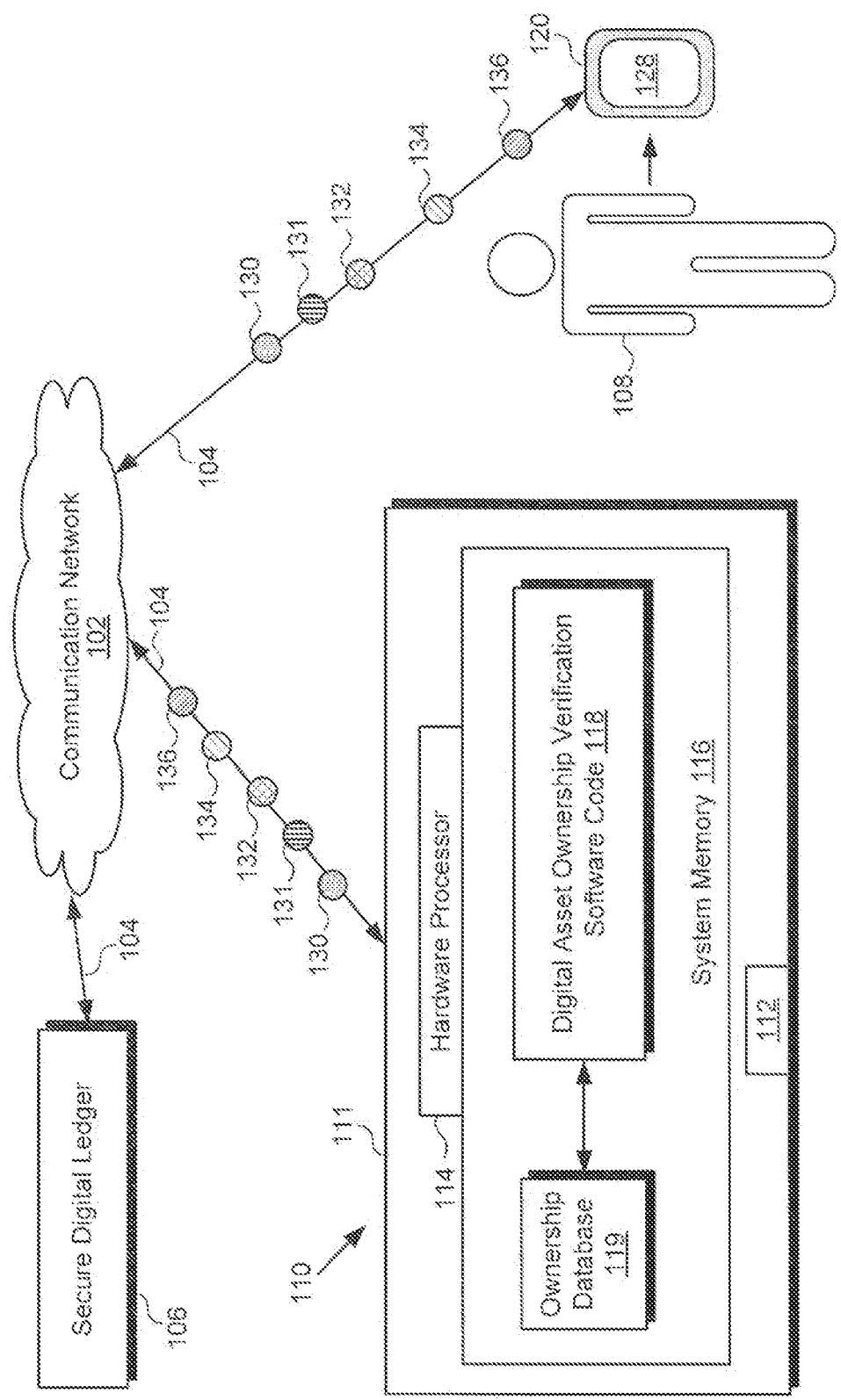
FIG. 1 shows a diagram of a digital watermarking-based digital asset ownership verification system, according to one exemplary implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, the acquisition and display of digital asset collections such as non-fungible token (NFT) based digital collections have become increasingly popular as symbols of status, particularly among users of social media. The technology known as an NFT allows individual artists and companies to sell ownership rights to a digital asset, such as a file containing a photo or other image or images, video, audio, or any other desirable digital representation of a real or virtual object. An NFT is a unit of data stored on a secure digital ledger, such as a blockchain for example, that certifies a digital asset to be unique and therefore non-fungible. An NFT can be used to represent a digital asset which is typically stored in and accessible via the cloud, and confer ownership of that digital asset to an individual or entity. However, in contrast to traditional ownership rights, ownership of an NFT does not prevent others from accessing, or even copying, the digital asset associated with the NFT. That is to say, an NFT confers ownership of a digital asset that is separate from copyright.

As also noted above, despite, or perhaps because of, the increasing popularity of digital assets and digital asset collections as symbols of status among users of social media, some social media users simply display digital assets that have been copied, thereby diluting the status associated with legitimately owned digital assets and digital asset collections. Because the secure digital ledgers on which digital asset ownership is recorded are typically independent from the social media platforms or web applications used to display digital asset collections, those social network platforms or web applications are unable to corroborate actual digital asset ownership. As further noted above, another complication is that, due to the number of different blockchains or other types of secure digital ledgers used to record digital asset ownership, a layman user would find it hard to identify which secure digital ledger to consult for evidence of digital asset ownership, making identification of the provenance of digital assets displayed via social media or web applications undesirably uncertain.

To address the challenge of enabling ownership verification of a digital asset by substantially any user of a social media platform or web application, the present application discloses systems and methods providing a digital watermarking-based verification solution. As disclosed herein, a digital asset ownership verification system is configured to embed an ownership verification message in digital token form into a digital asset, e.g. one or more images, video, or audio. Any user can then utilize a digital asset ownership verification client application loaded onto a personal communication device (e.g., a smartphone, desktop computer, laptop computer, tablet computer, smart TV, smartwatch, or virtual reality (VR) or augmented reality (AR) device, etc.) to scan a digitally watermarked digital asset in the form of one or more images or video using one or more input devices of the personal communication device, implemented as one or more cameras, or to scan a digitally watermarked digital asset in the form of audio using one or more input devices of the personal communication device, implemented as one or more microphones. The digital asset ownership verification client application may then extract the digital watermark and communicate with the digital asset ownership verification system to confirm or refute ownership of the digital asset by the user displaying the digital asset. As a result of making digital asset ownership verification easy for users in general, the present solution advantageously discourages fraudulent misrepresentation of digital asset ownership, while desirably enhancing the status conferred by legitimate ownership of a digital asset or collection of digital assets.

It is noted that, as defined in the present application, the term "NFT asset" may refer to any digital asset having its ownership certified by an NFT. Examples of a digital asset may include a digital file containing an image or images, video without audio, audio without video, or audio-video (AV) content, such as all or part of a TV episode, movie, or video game, to name a few. In addition, or alternatively, in some implementations, a digital asset may be or include digital representations of persons, fictional characters, locations, objects, and identifiers such as brands and logos, for example, which populate a VR, augmented AR, or mixed reality (MR) environment. Such digital assets may depict virtual worlds that can be experienced by any number of users synchronously and persistently, while providing continuity of data such as personal identity, user history, entitlements, possessions, payments, and the like. Moreover, in some implementations, a digital asset may be or include digital content that is a hybrid of traditional audio-video and fully immersive VR/AR/MR experiences, such as interactive video.

FIG. 1 shows a diagram of digital watermarking-based digital asset ownership verification system 110 (hereinafter "system 110"), according to one exemplary implementation. As shown in FIG. 1, system 110 includes computing platform 111 having transceiver 112, hardware processor 114, and system memory 116 implemented as a computer-readable non-transitory storage medium. According to the present exemplary implementation, system memory 116 stores digital asset ownership verification software code 118 and ownership database 119. In addition, FIG. 1 shows user 108 of system 110, personal communication device 120 having display 128 and also utilized by user 108, secure digital ledger 106, communication network 102, and network communication links 104 communicatively coupling system 110 to personal communication device 120 and secure digital ledger 106. Also shown in FIG. 1 are request 130 related to a digital asset and received from user 108, public key 131 of user 108, such as an NFT public key, randomly generated and encrypted symmetric key 132 (hereinafter "encrypted randomly generated symmetric key 132") provided by system 110, verification data 134, which may in some implementations include a digital asset and be encrypted using a decrypted version of encrypted randomly generated symmetric key 132, and digitally watermarked digital asset 136.

It is noted that, in some implementations, user 108 may be an owner of an existing digital asset, such as an NFT asset for example, who wishes to have ownership of their digital asset rendered readily verifiable by others through digital watermarking. Alternatively, user 108 may be a consumer seeking to obtain a digital asset for the first time, or a present owner of one or more digital assets who seeks to obtain an additional digital asset. It is further noted that in some implementations request 130 may include public key 131 of user 108.

With respect to the representation of system 110 shown in FIG. 1, it is noted that although digital asset ownership verification software code 118 and ownership database 119 are depicted as being stored in system memory 116 for conceptual clarity, more generally, system memory 116 may take the form of any computer-readable non-transitory storage medium. The expression "computer-readable non-transitory storage medium," as used in the present application, refers to any medium, excluding a carrier wave or other transitory signal that provides instructions to hardware processor of a computing platform, such as hardware processor 114 of computing platform 111. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Moreover, in some implementations, system 110 may utilize a decentralized secure digital ledger in addition to, or in place of, system memory 116. Examples of such decentralized secure digital ledgers may include a blockchain, hashgraph, directed acyclic graph (DAG), and HOLOCHAIN® ledger, to name a few. In use cases in which the decentralized secure digital ledger is a blockchain ledger, it may be advantageous or desirable for the decentralized secure digital ledger to utilize a consensus mechanism having a proof-of-stake (PoS) protocol, rather than the more energy intensive proof-of-work (PoW) protocol.

It is further noted that although FIG. 1 depicts digital asset ownership verification software code 118 and ownership database 119 as being co-located in a single instance of system memory 116, that representation is also merely provided as an aid to conceptual clarity. More generally, system 110 may include one or more computing platforms, such as computer servers for example, which may be co-located, or may form an interactively linked but distributed system, such as a cloud-based system, for instance. As a result, hardware processor 114 and system memory 116 may correspond to distributed processor and memory resources of system 110. Thus, it is to be understood that digital asset ownership verification software code 118 and ownership database 119 may be stored remotely from one another within the distributed memory resources of system 110.

Hardware processor 114 may include multiple hardware processing units, such as one or more central processing units, one or more graphics processing units, one or more tensor processing units, one or more field-programmable gate arrays (FPGAs), and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 111, as well as a Control Unit (CU) for retrieving programs, such as digital asset ownership verification software code 118, from system memory 116, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

In some implementations, computing platform 111 may correspond to one or more web servers, accessible over a packet-switched network such as the Internet (including Satellite internet connectivity), for example. Alternatively, computing platform 111 may correspond to one or more computer servers supporting a private wide area network (WAN), local area network (LAN), or included in another type of limited distribution or private network. In addition, or alternatively, in some implementations, system 110 may utilize a local area broadcast method, such as User Datagram Protocol (UDP) or Bluetooth, for instance. Furthermore, in some implementations, system 110 may be implemented virtually, such as in a data center. For example, in some implementations, system 110 may be implemented in software, or as virtual machines. Moreover, in some implementations, communication network 102 may be a high-speed network suitable for high performance computing (HPC), for example a 10 GigE network or an Infiniband network.

Transceiver 112 of system 110 may be implemented as any suitable wireless communication unit. For example, transceiver 112 may include a fourth generation (4G) wireless transceiver and/or a 5G wireless transceiver. In addition, or alternatively, transceiver 112 may be configured for communications using one or more of Wireless Fidelity (Wi-Fi®), Worldwide Interoperability for Microwave Access (WiMAX®), Bluetooth®, Bluetooth® low energy (BLE), ZigBee®, radio-frequency identification (RFID), near-field communication (NFC), and 60 GHz wireless communications methods.

In addition to performing digital asset ownership verification, in some implementations system 110 may be a creator of digital assets, such as a "minter" of NFT assets for example, or a distributor of digital assets created by others. Secure digital ledger 106 may take the form of a public or private secure digital ledger. Examples of such secure digital ledgers may include a blockchain, hashgraph, DAG, and HOLOCHAIN® ledger, to name a few. In use cases in which secure digital ledger 106 is a blockchain ledger, it may be advantageous or desirable to implement secure digital ledger 106 to utilize a consensus mechanism having a PoS protocol, rather than the more energy intensive PoW protocol. Although secure digital ledger 106 is shown to be remote from system 110 in FIG. 1, such as a cloud-based or distributed secure digital ledger, that implementation is merely exemplary. In other implementations, secure digital ledger 106 may be stored in system memory 116 and may be controlled by system 110.

Although personal communication device 120 is shown as a smartphone in FIG. 1 that representation is provided merely as an example. More generally, personal communication device 120 may be any suitable mobile or stationary computing device or system that implements data processing capabilities sufficient to support connections to communication network 102, and implement the functionality ascribed to personal communication device 120 herein. For example, in other implementations, personal communication device 120 may take the form of a desktop computer, laptop computer, tablet computer, smart TV, or a smart wearable device such as a smartwatch, or VR or AR device, for example.

With respect to display 128 of personal communication device 120, display 128 may be physically integrated with personal communication device 120 or may be communicatively coupled to but physically separate from personal communication device 120. For example, where personal communication device 120 is implemented as a smartphone, laptop computer, or tablet computer, display 128 will typically be integrated with personal communication device 120. By contrast, where personal communication device 120 is implemented as a desktop computer, display 128 may take the form of a monitor separate from personal communication device 120 in the form of a computer tower. Furthermore, display 128 of personal communication device 120 may be implemented as a liquid crystal display (LCD), a light-emitting diode (LED) display, an organic light-emitting diode (OLED) display, a quantum dot (QD) display, or any other suitable display screen that performs a physical transformation of signals to light.

Figure 2:
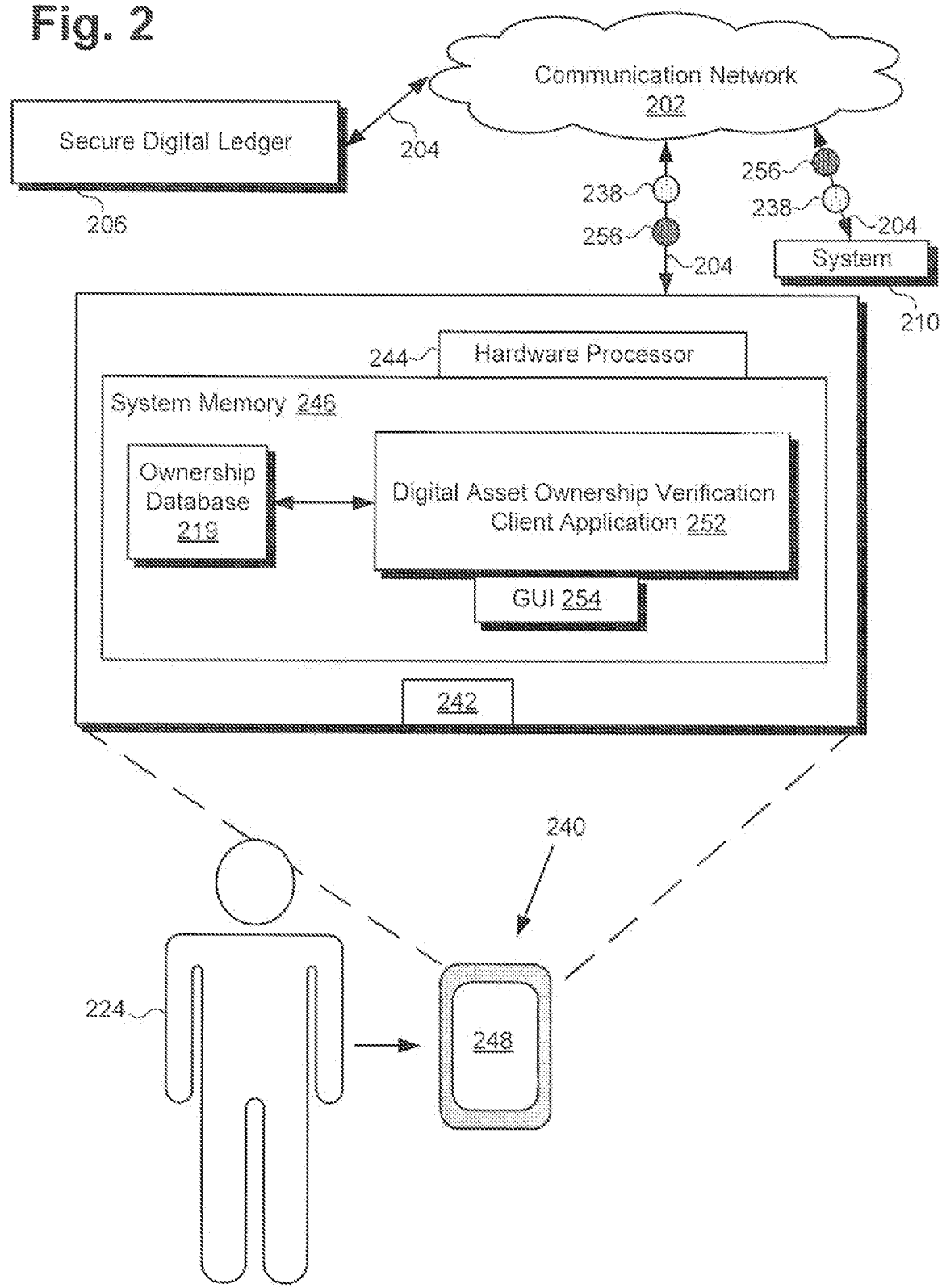
FIG. 2 shows an exemplary client system utilized by a user of the system shown in FIG. 1, according to one implementation.

FIG. 2 shows exemplary client system 240 utilized by another user 224 (hereinafter "other user 224") different than user 108 of FIG. 1, according to one implementation. As shown in FIG. 2, client system 240 includes transceiver 242, hardware processor 244, display 248, and system memory 246 implemented as a computer-readable non-transitory storage medium storing digital asset ownership verification client application 252 providing graphical user interface (GUI) 254, and optionally storing ownership database 219 as well. Also shown in FIG. 2 are system 210, communication network 202, network communication links 204, secure digital ledger 206, digital watermark 238, and ownership verification 256. It is noted that although the feature identified by reference number 256 is referred to herein as "ownership verification," that feature may serve to either corroborate digital asset ownership by a user, such as user 108 in FIG. 1, or refute ownership of a digital asset by a user displaying a copy of the digital asset. That is to say, ownership verification 256 may, in various instances, be a verification of digital asset ownership or a refutation of such ownership.

Although client system 240 is shown as a smartphone in FIG. 2, that representation is provided merely as an example. More generally, client system 240 may be any suitable mobile or stationary computing device or system that implements data processing capabilities sufficient to provide GUI 254, support connections to communication network 202, and implement the functionality ascribed to client system 240 herein. For example, in other implementations, client system 240 may take the form of a desktop computer, laptop computer, tablet computer, smart TV, or a smart wearable device such as a smartwatch, or VR or AR device for example.

System 210, communication network 202, network communication links 204, and secure digital ledger 206 correspond respectively in general to system 110, communication network 102, network communication links 104, and secure digital ledger 106, in FIG. 1. Thus, system 210, communication network 202, network communication links 204, and secure digital ledger 206 may share any of the characteristics attributed to respective system 110, communication network 102, network communication links 104, and secure digital ledger 106 by the present disclosure, and vice versa.

Hardware processor 244 of client system 240 may include multiple hardware processing units, such as one or more CPUs, one or more GPUs, one or more TPUs, one or more FPGAs, for example, as those features are described above. Moreover, Transceiver 242 of client system 240 may be implemented as any suitable wireless communication unit. For example, transceiver 242 may include a 4G wireless transceiver and/or a 5G wireless transceiver. In addition, or alternatively, transceiver 242 may be configured for communications using one or more of Wi-Fi, WiMAX, Bluetooth, Bluetooth low energy. ZigBee, RFID, NFC, and 60 GHz wireless communications methods.

Referring to FIGS. 1 and 2 in combination, it is noted that in some implementations, digital asset ownership verification client application 252 may be a thin client application of digital asset ownership verification software code 118. In those implementations, digital asset ownership verification client application 252 may enable client system 240 to provide digital watermark 238 extracted from a digitally watermarked digital asset to system 110/210 for processing, and to receive ownership verification 256 from system 110/210. However, in other implementations, digital asset ownership verification client application 252 may include substantially all of the digital asset ownership verification features and functionality of digital asset ownership verification software code 118.

According to the exemplary implementation shown in FIG. 2, digital asset ownership verification client application 252 is located in system memory 246 of client system 240, subsequent to transfer of digital asset ownership verification client application 252 to client system 240 over a packet-switched network, such as the Internet, for example, or subsequent to transfer from a physical medium such as an optical disc or external FLASH drive. Once present on client system 240, digital asset ownership verification client application 252 may be persistently stored in system memory 246 and may be executed locally on client system 240 by hardware processor 244.

With respect to display 248 of client system 240, like display 128 of personal communication device 120, shown in FIG. 1, display 248 may be physically integrated with client system 240 or may be communicatively coupled to but physically separate from client system 240. Moreover, and also like display 128, display 248 of client system 240 may be implemented as an LCD, LED display, or OLED display, as a QD display, or as any other suitable display screen that performs a physical transformation of signals to light.

An exemplary process for performing digital watermarking-based digital asset ownership verification is described below by reference to a specific use case in which a digital watermark is used to verify ownership of a digital asset in the form of one or more images, video, or other example of visual art. However, one of ordinary skill in the art will recognize how the present concepts can be readily adapted to verify ownership of an NFT associated with a digital audio asset.

Referring to FIGS. 1 and 2 in combination, according to one merely exemplary implementation, user 108 may send request 130 related to a digital asset to system 110/210, wherein request 130 includes public key 131 of user 108. Hardware processor 114 of system 110/210 may then execute digital asset ownership verification software code 118 to confirm that user 108 is the owner of public key 131, may use public key 131 to encrypt a randomly generated symmetric key to provide encrypted randomly generated symmetric key 132, and may transmit encrypted randomly generated symmetric key 132 to user 108. User 108 may then use their private key to decrypt encrypted randomly generated symmetric key 132.

User 108 may then use the randomly generated symmetric key to encrypt their digital asset and provide that encrypted digital asset along with additional encrypted ownership information to system 110/210 as verification data 134. The additional encrypted ownership information included in verification data 134 may include a username, nickname, or avatar handle of user 108 on a social media platform or web application, an identification of the encrypted digital asset, and the blockchain or other secure digital ledger on which ownership of the digital asset is recorded, as well as other metadata such as a transaction record of the digital asset, a personal message from user 108, or other personalized information included by user 108, for example. It is noted that in some use cases, the username, nickname or avatar handle of user 108 may serve to differentiate user 108 from other users of a web application that instantiates digital representations of persons, fictional characters, locations, objects, and identifiers such as brands and logos, for example, which populate a VR, AR, or MR environment. Such a web application may depict virtual worlds that can be experienced by any number of users synchronously and persistently, while providing continuity of data such as personal identity, user history, entitlements, possessions, payments, and the like. Moreover, in some implementations, such a web application may provide digital content that is a hybrid of traditional audio-video and fully immersive VR/AR/MR experiences, such as interactive video.

Once system 110/210 has received verification data 134, hardware processor 114 may execute digital asset ownership verification software code 118 to decrypt and retrieve verification data 134. Hardware processor 114 of system 110/210 may then further execute digital asset ownership verification software code 118 to verify that user 108 is the real owner of the NFT by checking secure digital ledger 106/206 to confirm that the digital asset is associated with public key 131 of user 108. Once user 108 is verified to be the owner of the digital asset, hardware processor 114 may execute digital asset ownership verification software code 118 to create an ownership record for user 108 that includes the additional information included in verification data 134 and store the ownership record in ownership database 119.

Hardware processor 114 of system 110/210 may then execute digital asset ownership verification software code 118 to generate digital watermark 238 to reference the ownership record of user 108 and embed digital watermark 238 into the digital asset to generate digitally watermarked digital asset 136. It is noted that digital watermarking is a way to add embedded information to a media file by making use of the pixels or bits of the media file to hide the embedded information. This embedded information can be used to track the source of the file (in case of piracy) or to identify the creator, original owner, other previous owners, or the present owner of the file. According to the present exemplary implementation, digital watermark 238 embedded into digitally watermarked digital asset 136 is used to access the ownership record of user 108 stored in ownership database 119 in order to verify ownership of digitally watermarked digital asset 136 by user 108.

It is further noted that when embedding a humanly imperceptible digital watermark, it may be advantageous or desirable to embed such a digital watermark in a high-resolution digital file having a high pixel or bit count, so that if a few pixels or bits are changed in the process of embedding the digital watermark that alteration will not distort the image visually or audibly. The objective of the digital watermark is to embed owner verification data into the digital asset without affecting its visual or audio qualities from the standpoint of human perception.

For the specific use case of visual art digital assets, digital watermarks work by slightly varying the color values in the pixels of an image file. A pixel is a fundamental visual unit of an image composed of three color channels: red, green, and blue. By mixing various shades of red, green, and blue, every other color a computer can render can be generated so as to produce visual image. One technique for embedding an imperceptible digital watermark into an image is by rounding these channel color values to the nearest even or odd number to embed information into the image file. Odd numbers mean the underlying watermark pixel is white, while even numbers mean the underlying watermark pixel is black. Rounding these values to even or odd numbers actually changes the underlying image but in a way that is imperceptible to the naked eye. For example, it is very difficult for the human eye to discern the difference between a red shade designated by 177/255 and a red shade designated by 178/255. The technical term for this watermarking technique is least significant bit where ownership information can be effectively embedded and hidden within a data file by changing the minimum weighting value (rightmost bit) of binary numbers.

It is noted that in the use case of audio digital assets, a number of different well established techniques for generating audio watermarks are known in the art. For example, one technique adds watermarking sounds that are outside the human auditory spectrum to an audio file. Alternatively, a more robust technique is spread spectrum audio watermarking in which the watermark is distributed over the audio spectrum of the audio file. This technique embeds the audio watermark with the audio content, making it difficult to remove.

Once digital watermark 238 has been embedded into the digital asset to generate digitally watermarked digital asset 136, digitally watermarked digital asset 136 is provided by system 110/210 to user 108. It is noted that digital watermark 238 may be signed by the system 110/210 as a trusted authority to prevent modification or cloning of digital watermark 238. It is further noted that because only an imperceptible watermark has been embedded into the original digital asset, digitally watermarked digital asset 136 still looks or sounds the same as the original digital asset. User 108 can then share digitally watermarked digital asset 136 on social media or any other digital space.

Another user of the social media or other digital display space on which user 108 displays digitally watermarked digital asset 136, such as other user 224 for example, can advantageously verify the ownership of the digital asset using digital asset ownership verification client application 252. In the case of a visual art digital asset, digital asset ownership verification client application 252 can cause one or more input devices of client system 240, implemented as one or more cameras, to scan digitally watermarked digital asset 136, e.g., similar to scanning a quick response (QR) code, to retrieve digital watermark 238. In the case of an audio digital asset, digital asset ownership verification client application 252 can cause one or more input devices of client system 240, implemented as one or more microphones, to scan digitally watermarked digital asset 136 to retrieve digital watermark 238.

When digital watermark 238 has been retrieved, digital asset ownership verification client application 252 can be used to access the associated ownership record on ownership database 119 and obtain ownership verification 256 verifying or refuting ownership of the digital asset by user 108. When ownership verification 256 verifies ownership of the digital asset by user 108, ownership verification 256 may include a username, nickname, or avatar handle of user 108 on a social media platform or web application, a personal message from user 108, or other personalized information included by user 108 in verification data 134, for example.

Figure 3:
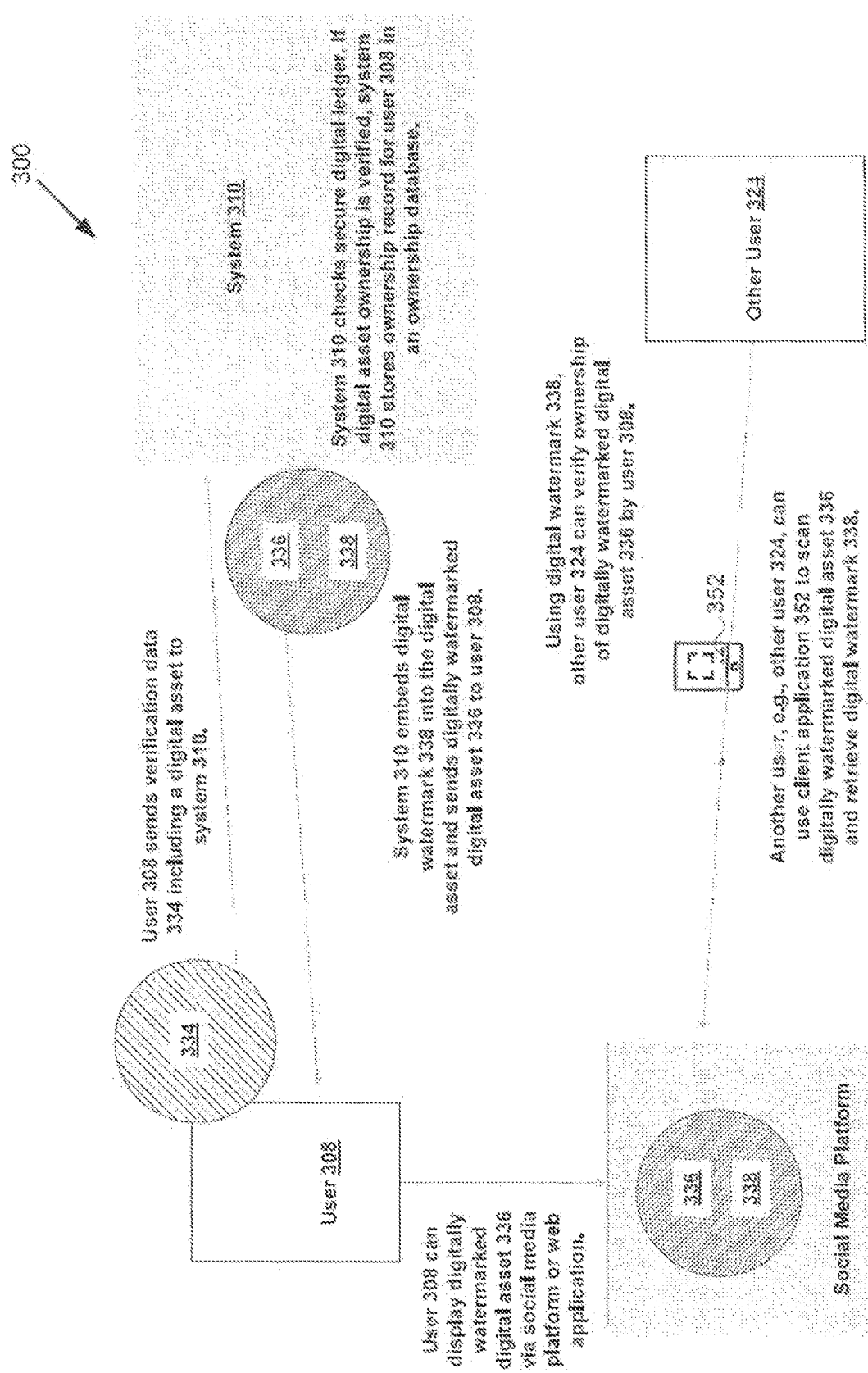
FIG. 3 shows a diagram illustrating some exemplary interactions that may occur in a digital watermarking-based digital asset ownership verification process, according to one implementation.

FIG. 3 shows diagram 300 illustrating some of the interactions that may occur in the digital watermarking-based digital asset ownership verification process described above by reference to FIGS. 1 and 2. It is noted that system 310 in FIG. 3 corresponds in general to system 110/210 in FIGS. 1 and 2, and may share any of the characteristics attributed to system 110/210 by the present disclosure. In addition, user 308 and digitally watermarked digital asset 336, in FIG. 3, correspond respectively in general to user 108 and digitally watermarked digital asset 136, in FIG. 1, and may share any of the characteristics attributed to those corresponding features by the present disclosure. Moreover, other user 324, digital watermark 338, and client application 352, in FIG. 3, correspond respectively in general to other user 224, digital watermark 238, and digital asset ownership verification client application 252, in FIG. 2, and may share any of the characteristics attributed to those corresponding features by the present disclosure.

Figure 4A:
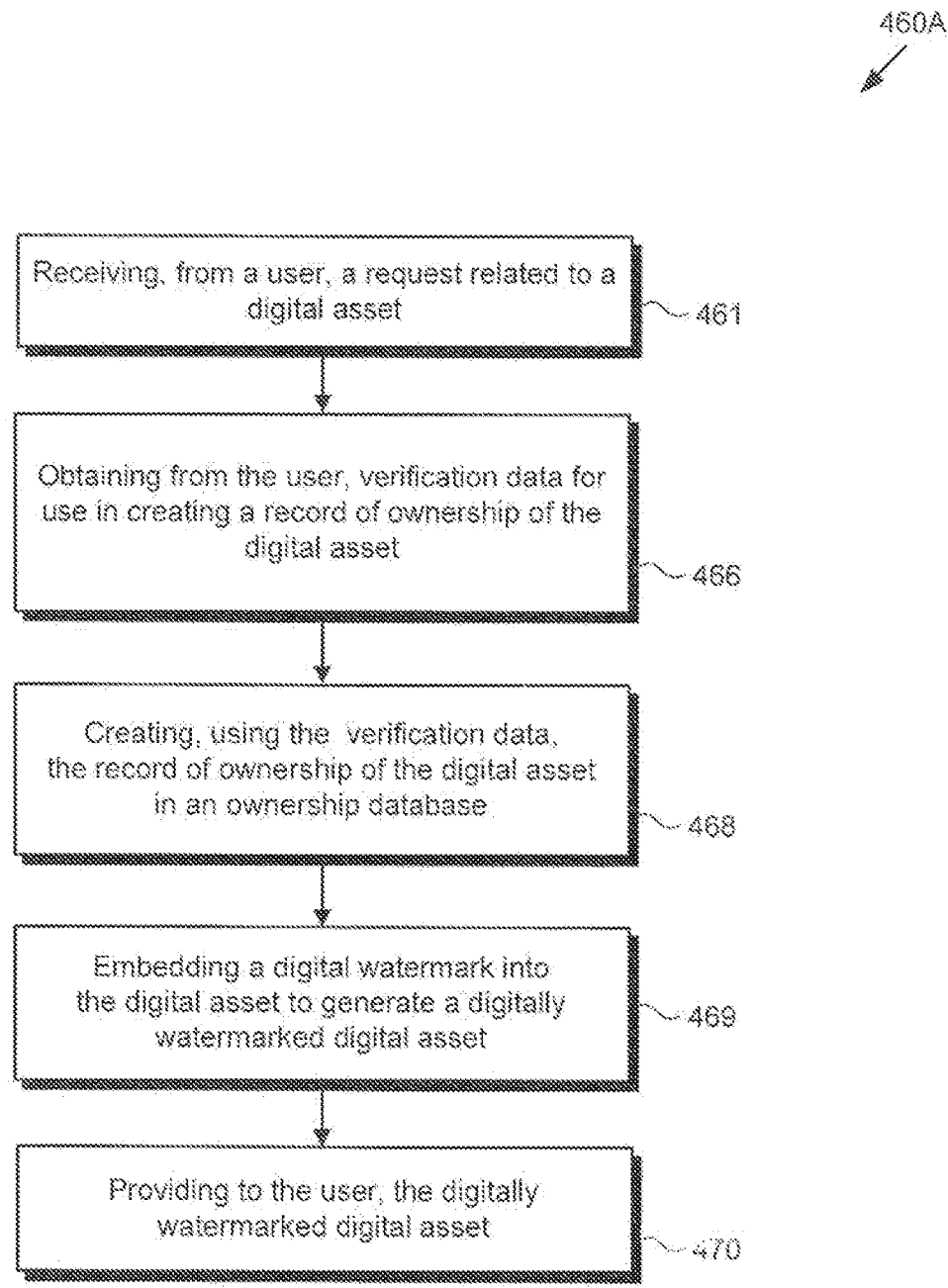
FIG. 4A shows a flowchart outlining an exemplary method for performing digital watermarking-based digital asset ownership verification, according to one implementation.
Figure 4B:
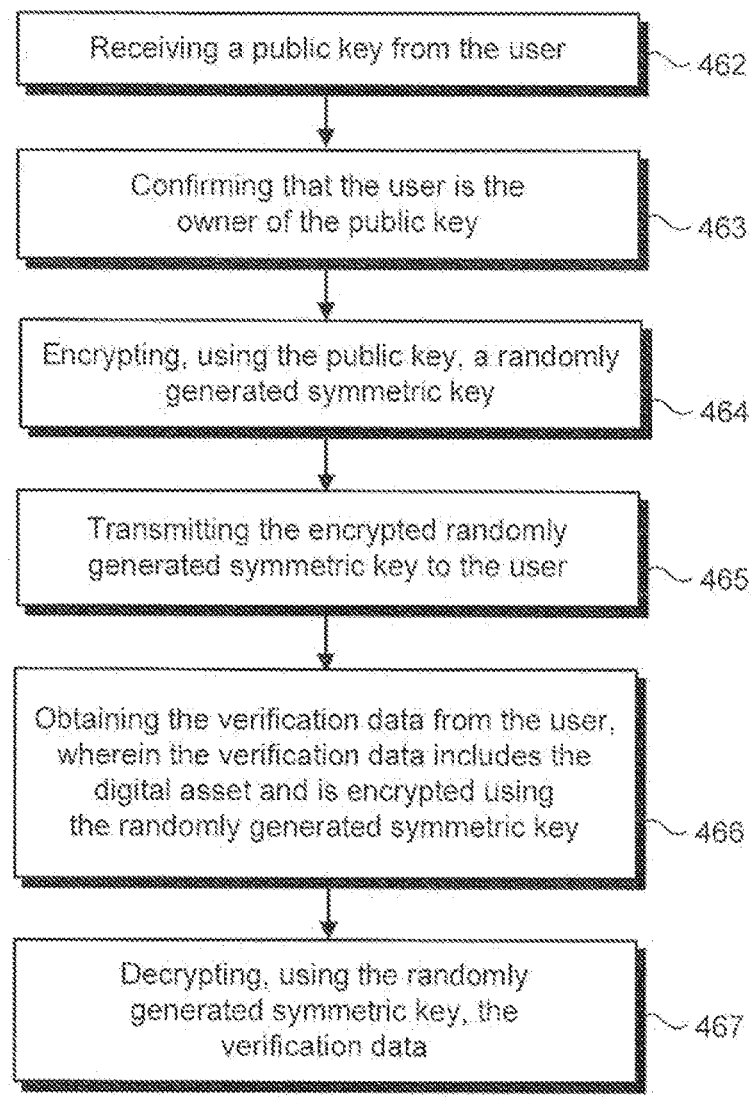
FIG. 4B shows a flowchart including additional actions for extending the method outlined in FIG. 4A, according to one implementation.

The functionality of system 110/210/310, and digital asset ownership verification software code 118, shown variously in FIGS. 1, 2, and 3 will be further described by reference to FIGS. 4A and 4B. FIG. 4A shows flowchart 460A outlining an exemplary method for performing digital watermarking-based digital asset ownership verification, according to one implementation, while FIG. 4B shows flowchart 460B including additional actions for extending the method outlined in FIG. 4A, according to one implementation. With respect to the methods outlined in FIGS. 4A and 4B, it is noted that certain details and features have been left out of flowcharts 460A and 460B in order not to obscure the discussion of the inventive features in the present application.

Referring to FIG. 4A in combination with FIG. 1, flowchart 460A includes receiving, from user 108, request 130 related to a digital asset (action 461). As noted above, in some implementations, user 108 may be a consumer seeking to obtain a digital asset for the first time, or a present owner of one or more digital assets who seeks to obtain an additional digital asset. Moreover, and as also noted above, in addition to performing digital asset ownership verification, in some implementations system 110 may be a creator of digital assets, such as a minter of NFT assets for example, or a distributor of digital assets created by others. Thus, in some use cases request 130 may be a request to obtain a digital asset using system 110. As shown in FIG. 1, request 130 may be received by system 110 via communication network 102 and network communication links 104. Request 130 may be received in action 461 by digital asset ownership verification software code 118, executed by hardware processor 114.

As noted above, examples of a digital asset may include a digital file containing one or more images, video without audio, audio without video, or AV content, such as all or part of a TV episode, movie, or video game, to name a few. In addition, or alternatively, in some implementations, a digital asset may be or include digital representations of persons, fictional characters, locations, objects, and identifiers such as brands and logos, for example, which populate a VR, AR, or MR environment. Such digital assets may depict virtual worlds that can be experienced by any number of users synchronously and persistently, while providing continuity of data such as personal identity, user history, entitlements, possessions, payments, and the like. Moreover, in some implementations, a digital asset may be or include digital content that is a hybrid of traditional audio-video and fully immersive VR/AR/MR experiences, such as interactive video. By way of example, the digital asset to which request 130 is related may be an NFT asset having its ownership certified by an NFT.

Continuing to refer to FIG. 4A in combination with FIG. 1, flowchart 460A further includes obtaining, from user 108, verification data 134 for use in creating a record of ownership of the digital asset (action 466). It is noted that according to the exemplary method outlined in FIG. 4A, flowchart 460A transitions directly from action 461 to action 466. However, in other implementations, as shown by, and described by reference to, FIG. 4B, a variation of the present method may include some or all of intervening actions 462, 463, 464, and 465 described below.

With respect to action 466, in use cases in which request 130 is a request from user 108 to obtain a digital asset using system 110, verification data 134 may be obtained in action 466 for use in creating a record of ownership of the digital asset by user 108. As noted above, verification data 134 may include a username, nickname, or avatar handle of user 108 on a social media platform or web application, the blockchain or other secure digital ledger on which ownership of the digital asset is recorded, as well as other metadata such as a transaction record of the digital asset, a personal message from user 108, or other personalized information included by user 108, for example. As shown in FIG. 1, verification data 134 may be obtained from user 108 via communication network 102 and network communication links 104. Verification data 134 may be obtained in action 466 by digital asset ownership verification software code 118, executed by hardware processor 114.

Continuing to refer to FIG. 4A in combination with FIG. 1, flowchart 460A further includes creating, using verification data 134, the record of ownership of the digital asset in ownership database 119 (action 468). It is noted that according to the exemplary method outlined in FIG. 4A, flowchart 460A transitions directly from action 466 to action 468. However, in other implementations, as shown by and described by reference to, FIG. 4B, a variation of the present method may include intervening action 467 described below.

With respect to action 468, as noted above, verification data 134 may include a username, nickname, or avatar handle of user 108 on a social media platform or web application, the blockchain or other secure digital ledger on which ownership of the digital asset is recorded, as well as other metadata such as a transaction record of the digital asset, a personal message from user 108, or other personalized information included by user 108. Thus, the record of ownership created in action 468 may include any or all of the information included in verification data 134. Creation of the record of ownership of the digital asset in ownership database 119 may be performed in action 466 by digital asset ownership verification software code 118, executed by hardware processor 114.

Referring to FIG. 4A in combination with FIGS. 1 and 2, flowchart 460A further includes embedding a digital watermark, such as digital watermark 238 in FIG. 2, into the digital asset to generate digitally watermarked digital asset 136 (action 469). Generation of digitally watermarked digital asset 136 using digital watermark 238 may be performed in action 469 by digital asset ownership verification software code 118, executed by hardware processor 114.

As noted above, in use cases in which the digital asset is or includes one or more images or video, digital watermark 238 may take the form of a visual watermark imperceptible to a human viewer of the digital asset. For example, in those use cases embedding digital watermark 238 in the digital asset may include modifying a color value of one or more pixels of the one or more images of video.

As further noted above, in use cases in which the digital asset is or includes a digital audio file, digital watermark 238 may take the form of an audio watermark imperceptible to a human listener of the digital audio file. For example, in those use cases digital watermark 238 may include sound outside an auditory spectrum perceptible to humans. Alternatively, or in addition, digital watermark 238 may be audio distributed over the audio spectrum of the digital audio file, i.e., may be a spread spectrum digital watermark.

Referring to FIG. 4A in combination with FIG. 1, flowchart 460A further includes providing, to user 108, digitally watermarked digital asset 136 (action 470). It is noted that the digital watermark embedded in digitally watermarked digital asset 136 and the record of ownership for the digital asset created in action 468 advantageously enable ownership verification of the digital asset. As shown in FIG. 1, digitally watermarked digital asset 136 may be provided to use 108 by system 110 via communication network 102 and network communication links 104. Digitally watermarked digital asset 136 may be provided to user 108 in action 470 by digital asset ownership verification software code 118, executed by hardware processor 114.

Referring to FIG. 4B in combination with FIGS. 4A and 1, it is noted that although in some implementations user 108 may be a consumer seeking to obtain a digital asset, in other implementations user 108 may be a present owner of an existing digital asset, such as an NFT asset for example, who wishes to have ownership of their digital asset rendered readily verifiable through digital watermarking. In order for ownership of a digital asset to be verifiable, user 108 owning that digital asset may initiate the digital watermarking process described above by requesting digital watermarking of a digital asset by system 110. Any digital asset owner having his/her ownership of a digital asset recorded on any secure digital ledger can request digital watermarking by system 110 and enjoy the benefits of the above-described ownership verification solution.

In use cases in which user 108 is a present owner of an existing digital asset who wishes to have ownership of their digital asset rendered verifiable through digital watermarking, the method outlined by the combination of flowcharts 460A and 460B further includes, before creating the record of ownership of the digital asset in action 468 of flowchart 460A, receiving public key 131 from user 108 (action 462). In some use cases, as depicted in FIG. 1, public key 131 may be received from user 108 separately from request 130 received in action 461. However, and as noted above, in some implementations request 130 may include public key 131. Thus, in some implementations action 461 may precede action 462, while in other implementations, action 461 and 462 may be performed contemporaneously as action 461/462. As shown in FIG. 1, public key 131 may be received in action 462, or in action 461/462, by system 110 via communication network 102 and network communication links 104. Public key 131 may be received by digital asset ownership verification software code 118, executed by hardware processor 114.

Continuing to refer to FIGS. 4A and 4B in combination with FIG. 1, the method outlined by the combination of flowcharts 460A and 460B further includes confirming that user 108 is the owner of public key (action 463). Confirmation that user 108 is the owner of public key 131 may be performed by digital asset ownership verification software code 118, executed by hardware processor 114.

Continuing to refer to FIGS. 4A and 4B in combination with FIG. 1, the method outlined by the combination of flowcharts 460A and 460B further includes encrypting, using public key 131, a symmetric key randomly generated by system 110 to produce encrypted randomly generated symmetric key 132 (action 464). Action 464 may be performed by digital asset ownership verification software code 118, executed by hardware processor 114.

Continuing to refer to FIGS. 4A and 4B in combination with FIG. 1, the method outlined by the combination of flowcharts 460A and 460B further includes transmitting encrypted randomly generated symmetric key 132 to user 108 (action 465). Encrypted randomly generated symmetric key 132 may be transmitted to user 108 via communication network 102 and network communication links 104, in action 464, by digital asset ownership verification software code 118, executed by hardware processor 114.

As noted above, upon receiving encrypted randomly generated symmetric key 132 from system 110, user 108 may then use private key 131 to decrypt encrypted randomly generated symmetric key 132. The decrypted randomly generated symmetric key may then be used to encrypt all subsequent messaging between user 108 and system 110. Thus user 108 may utilize the randomly generated symmetric key to encrypt their digital asset and provide that encrypted digital asset along with additional encrypted ownership information to system 110/210 as verification data 134. That is to say, according to the exemplary method outlined by the combination of flowcharts 460A and 460B, verification data 134 obtained from user 108 in action 466 includes the digital asset and is encrypted using the symmetric key randomly generated by system 110, i.e., is encrypted verification data including the encrypted digital asset.

Continuing to refer to FIGS. 4A and 4B in combination with FIG. 1, in implementations in which verification data 134 is obtained in action 466 as encrypted verification data including the encrypted digital asset, the method outlined by the combination of flowcharts 460A and 460B further includes decrypting, using the symmetric key randomly generated by system 110, verification data 134 (action 467). Decryption of verification data 134 using the symmetric key randomly generated by system 110 may be performed, in action 467, by digital asset ownership verification software code 118, executed by hardware processor 114. It is noted that the method outlined by the combination of flowcharts 460A and 460B may then proceed with actions 468, 469, and 470 described above.

In the event the ownership of the digital asset changes after digital watermark 238 is embedded in digitally watermarked digital asset 136, system 110/210 may return a failure message or refutation of ownership of digitally watermarked digital asset 136 by the previous digital asset owner. It is noted that if ownership of the digital asset changes, system 110/210 can detect this because it can read the secure digital ledger on which ownership of the digital asset is recorded and can discover that the previous owner is no longer the current owner of the digital asset. In some implementations, system 110/210 may be configured to periodically check the secure digital ledgers on which digital asset ownership is recorded in order to identify the public keys of current owners of digital assets.

Thus, the present application discloses systems and methods enabling digitally watermarking-based digital asset ownership verification that address and overcome the deficiencies in the conventional art. It is emphasized that the present verification solution verifies digital asset ownership rather than copyright. Copyright shows who is the original creator of the digital asset, while ownership identifies the current owner of the digital asset but not necessarily its creator. The ownership verification solutions disclosed in the present application advances the state-of-the-art in several distinct ways, including elimination of the technical challenge of reading blockchain or other secure digital ledger for a general user. The present solution addresses this challenge by providing digital asset ownership verification client application 252 that enables any user to verify ownership of a digital asset that has been digitally watermarked as disclosed herein, almost effortlessly.

In addition, the present ownership verification solution can be used for any digitally watermarked digital assets displayed on any social media platform or via any web application. That is to say, system 110/210 acts as a trusted third-party authority that can perform digital asset ownership verification for any social media platform or web application, even in use cases where that social media platform or web application does not support the blockchain or other secure digital ledger on which ownership of the digital asset is recorded. This is because during the verification process, a digital asset owner can submit their social media username or nickname to system 110/210. After verifying the ownership, the present ownership verification solution will link the social media username or nickname of the digital asset owner to the displayed digital asset, rather than the true identity of the digital asset owner. Another benefit of this approach is that it protects personally identifiable information (PII) of the digital asset owner, while also preventing the public key of the digital asset owner from being exposed thereby preventing others from tracing previous ownerships or transactions that are associated with this public key without the express inclusion of that information in verification data 134 by the digital asset owner.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
 a hardware processor; and
 a system memory storing a software code;
 the hardware processor configured to execute the software code to:
  receive, from a user, a request related to a digital asset;
  obtain, from the user, in response to receiving the request, verification data encrypted by the user for use in creating a record of ownership of the digital asset;
  create, using the verification data, the record of ownership of the digital asset in an ownership database;
  embed a digital watermark into the digital asset to generate a digitally watermarked digital asset; and
  provide, to the user, the digitally watermarked digital asset;
 wherein the digital watermark embedded in the digitally watermarked digital asset and the record of ownership of the digital asset in the ownership database enable ownership verification of the digital asset.

2. The system of claim 1, wherein the encrypted verification data includes the digital asset and is encrypted using a randomly generated symmetric key.

3. The system of claim 2, wherein prior to creating the record of ownership, the hardware processor is further configured to execute the software code to:
 receive a public key from the user;
 confirm that the user is the owner of the public key;
 encrypt, using the public key, the randomly generated symmetric key; and
 transmit the encrypted randomly generated symmetric key to the user.

4. The system of claim 1, wherein the digital asset is a non-fungible token (NFT) asset having its ownership certified by an NFT.

5. The system of claim 1, wherein the digital asset comprises a digital image, and wherein the digital watermark comprises a visual watermark imperceptible to a human viewer of the digital image.

6. The system of claim 5, wherein embedding the digital watermark in the digital asset comprises modifying a color value of one or more pixels of the digital image.

7. The system of claim 1, wherein the digital asset comprises a digital audio file, and wherein the digital watermark comprises an audio watermark imperceptible to a human listener of the digital audio file.

8. The system of claim 7, wherein the digital watermark comprises sound outside an auditory spectrum perceptible to humans.

9. The system of claim 7, wherein the digital watermark is distributed over the audio spectrum of the digital audio file.

10. The system of claim 1, wherein the verification data includes at least one of a username, nickname, or avatar handle of the user on a social media platform or web application.

11. A method for use by a system including a hardware processor and a system memory storing a software code, the method comprising:
receiving from a user, by the software code executed by the hardware processor, a request related to a digital asset;
obtaining from the user, by the software code executed by the hardware processor, in response to receiving the request, verification data encrypted by the user for use in creating a record of ownership of the digital asset;
creating, by the software code executed by the hardware processor and using the verification data, the record of ownership of the digital asset in an ownership database;
embedding a digital watermark into the digital asset, by the software code executed by the hardware processor, to generate a digitally watermarked digital asset; and
providing to the user, by the software code executed by the hardware processor, the digitally watermarked digital asset;
wherein the digital watermark embedded in the digitally watermarked digital asset and the record of ownership of the digital asset in the ownership database enable ownership verification of the digital asset.

12. The method of claim 11, wherein the verification data includes the digital asset and is encrypted using a randomly generated symmetric key.

13. The method of claim 12, further comprising, prior to creating the record of ownership:
receiving, by the software code executed by the hardware processor, a public key from the user;
confirming, by the software code executed by the hardware processor, that the user is the owner of the public key;
encrypting, by the software code executed by the hardware processor, using the public key, the randomly generated symmetric key; and
transmitting, by the software code executed by the hardware processor, the encrypted randomly generated symmetric key to the user.

14. The method of claim 11, wherein the digital asset is a non-fungible token (NFT) asset having its ownership certified by an NFT.

15. The method of claim 11, wherein the digital asset comprises a digital image, and wherein the digital watermark comprises a visual watermark imperceptible to a human viewer of the digital image.

16. The method of claim 15, wherein embedding the digital watermark in the digital asset comprises modifying a color value of one or more pixels of the digital image.

17. The method of claim 11, wherein the digital asset comprises a digital audio file, and wherein the digital watermark comprises an audio watermark imperceptible to a human listener of the digital audio file.

18. The method of claim 17, wherein the digital watermark comprises sound outside an auditory spectrum perceptible to humans or is distributed over the audio spectrum of the digital audio file.

19. The method of claim 11, wherein the verification data includes at least one of a username, nickname, or avatar handle of the user on a social media platform or web application.

20. A method for use by a client system to evaluate an ownership claim of a digital asset by a first user, the client system utilized by a second user and including a hardware processer, a system memory storing a digital asset ownership verification client application, and an input device, the method comprising:
detecting, by the digital asset ownership verification client application executed by the hardware processor of the client system and using the input device, a presence of a digital watermark embedded in the digital asset displayed by the first user;
accessing, by the digital asset ownership verification client application executed by the hardware processor of the client system and based on the digital watermark, an ownership record for the digital asset created using information included in verification data encrypted by and obtained from the first user; and
obtaining, by the digital asset ownership verification client application executed by the hardware processor of the client system and using the ownership record, data verifying or refuting ownership of the digital asset by the first user.

* * * * *